(12) United States Patent
Chen et al.

(10) Patent No.: US 6,450,698 B1
(45) Date of Patent: Sep. 17, 2002

(54) CONNECTOR ASSEMBLY FLOATING MOUNT

(75) Inventors: Wenzong Chen, Naperville, IL (US); Jeffrey A. Matasek, Cedarburg, WI (US); Igor Grois, Northbrook; B. Daniel Szilagyi, Naperville, both of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/568,517

(22) Filed: May 9, 2000

(51) Int. Cl.[7] .................................................. G02B 6/36
(52) U.S. Cl. .............................. 385/88; 385/56; 385/76; 439/79; 439/248; 439/564
(58) Field of Search ............................... 385/88–94, 53, 385/56, 60, 76, 78; 439/59, 64, 76.1, 78, 79, 248, 564

(56) References Cited

U.S. PATENT DOCUMENTS 5,073,046 A * 12/1991 Edwards et al. .............. 385/90

* cited by examiner

Primary Examiner—Cassandra Spyrou
Assistant Examiner—Euncha Cherry
(74) Attorney, Agent, or Firm—A. A. Tirva

(57) ABSTRACT

A system is provided for mounting a connecting device to a substrate with relative floating movement therebetween. The system includes a connector housing adapted for mounting on the substrate and including at least one elongated channel in a side of the housing. The channel extends generally perpendicular to the substrate and has an elongated restricted mouth opening at a side thereof. An elongated fastening post is snap-fit into the channel past the restricted mouth thereof to a preload position. A cross-dimension of the channel is larger than a cross-dimension of the fastening post so that the post can float relative to the housing. A fastener engages with the substrate and is operatively associated with the fastening post for tightening the post against the substrate, leaving the connector housing with floating movement relative to the substrate in a direction generally parallel to the substrate. The post may be longer than the channel to provide for floating movement of the housing relative to the substrate in a direction generally perpendicular to the substrate.

22 Claims, 5 Drawing Sheets

CONNECTOR ASSEMBLY FLOATING MOUNT

FIELD OF THE INVENTION

This invention generally relates to the art of connector assemblies and, particularly, to a system for mounting a connecting device to a substrate with relative floating movement therebetween.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems continue to be encountered in designing fiber optic connector assemblies or other connector assemblies, including applications involving backplanes, motherboards, daughterboards and the like. Such problems include properly and precisely placing a connector assembly on a substrate, such as a printed circuit board, accommodating misalignment of the connectors during mating, allowing relative floating movement between various components of the system and similar positional-type problems. Other problems simply involve efforts to simplify the design of connector assemblies. The present invention is directed to solving these problems and to providing various improvements in such connector assemblies, particularly in accommodating misalignment of the connectors during mating by providing relative floating movement of at least one of the connectors. Although the invention is shown herein embodied in a fiber optic connector assembly, the invention is equally applicable for use with other types of connector assemblies, such as electrical connector assemblies.

SUMMARY OF THE INVENTION

An object, therefore, of the invention is to provide a new and improved system for mounting a connecting device to a substrate with relative floating movement therebetween.

In the exemplary embodiment of the invention, the system includes a connector housing adapted for mounting on the substrate and including at least one elongated channel in the side of the housing. The channel extends generally perpendicular to the substrate and has an elongated restricted mouth opening at a side thereof. An elongated fastening post is snap-fit into the channel past the restricted mouth to a preload position. A fastener is engaged with the substrate and is operatively associated with the fastening post for tightening the post against the substrate.

As disclosed herein, a cross-dimension of the channel is larger than a cross-dimension of the fastening post so that the post can float relative to the housing. Therefore, when the post is tightened against the substrate, the connector housing is left with floating movement relative to the substrate in a direction generally parallel to the substrate. It also is contemplated that the fastening post be longer than the channel to provide for floating movement of the housing relative to the substrate in a direction generally perpendicular to the substrate.

The connector housing is adapted for mating with a complementary connecting device along an axis generally parallel to the substrate and perpendicular to the post-receiving channel. The larger cross-dimension of the channel is generally perpendicular to the mating axis whereby the housing floats in that direction. The cross-dimensions of the channel and the fastening posts are substantially equal in a direction generally parallel to the mating axis, whereby the housing is prevented from floating in that direction.

Other features of the invention include the fastening post having an internally threaded end near the substrate, and the fastener comprises an externally threaded bolt. The fastening post has enlarged heads at opposite ends thereof engageable with stop surfaces on the connector housing at opposite ends of the channel. The fastening bolt has a socket in an end thereof remote from the substrate for holding the post to facilitate tightening the post against the substrate.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
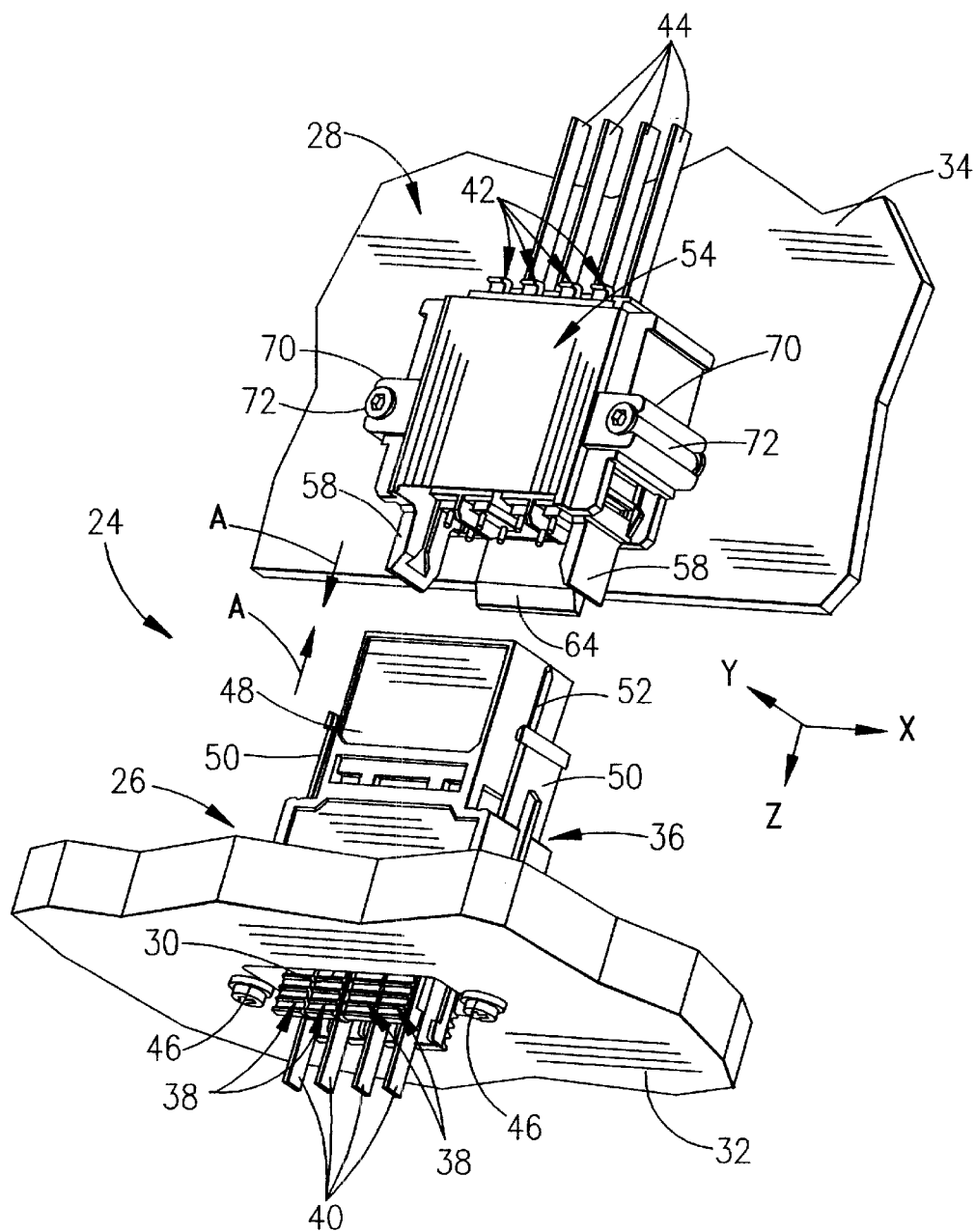
FIG. 1 is a perspective view of a mating connector assembly embodying the concepts of the invention, with the assembly in unmated condition.
Figure 2:
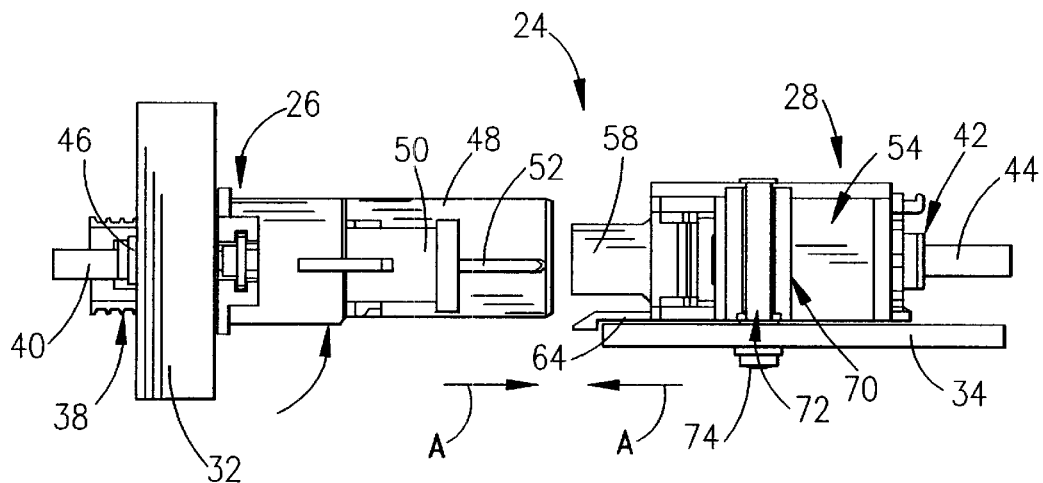
FIG. 2 side elevational view of the mating connector assembly as shown in FIG. 1.
Figure 3:
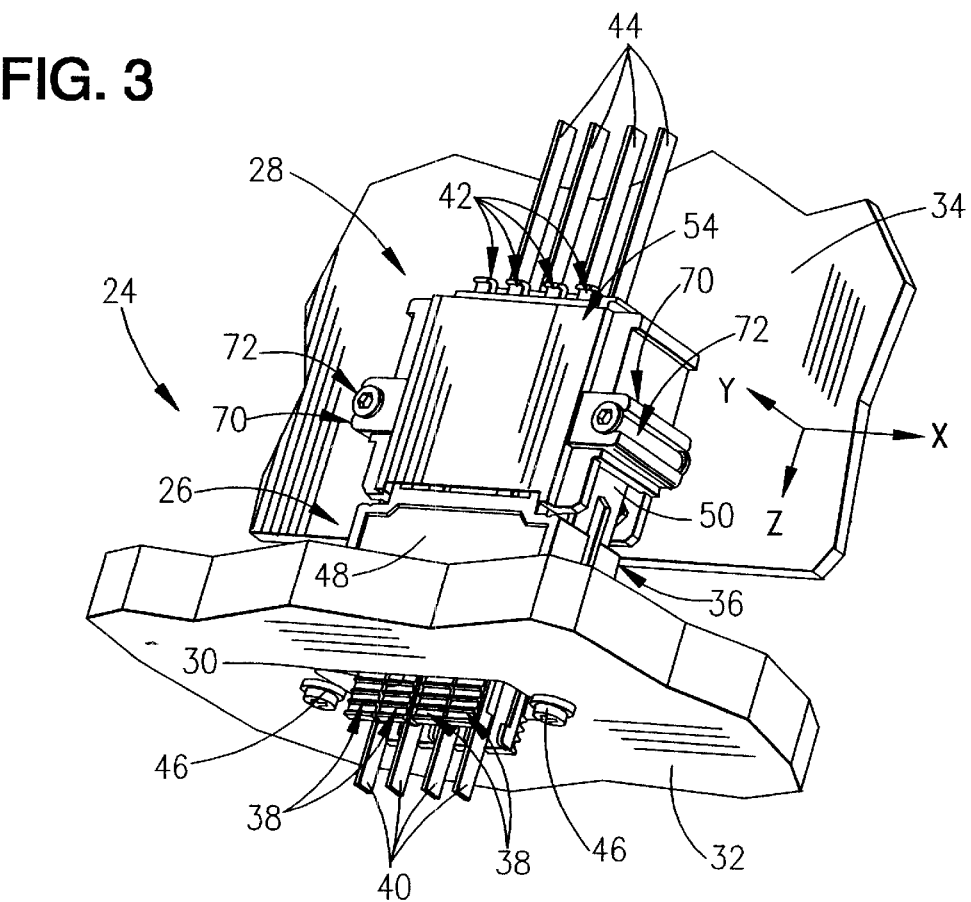
FIG. 3 is a perspective view of the mating connector assembly of FIG. 1, in mated condition.

Referring to the drawings in greater detail, and first to FIGS. 1–3, the invention is embodied in a mating connector assembly, generally designated 24, which includes a backplane connector assembly, generally designated 26, mateable with a daughterboard connector assembly, generally designated 28. The backplane connector assembly is mounted in an aperture 30 in a substrate, panel or backplane 32 which, in the preferred embodiment, is a printed circuit board. Specifically, backplane 32 can be considered the "motherboard" herein. The daughterboard connector assembly is mounted on a top surface of a second printed circuit board 34 which is considered the "daughterboard" herein.

Backplane connector assembly 26 includes an adapter, generally designated 36, which is mounted in aperture 30 in motherboard 32. Four fiber optic connector modules, generally designated 38, are inserted into adapter 36, through aperture 30, from the front of backplane 32. Each fiber optic connector module is terminated to a multi-fiber cable 40. Each cable is a flat or "ribbon" cable having a plurality of optical fibers.

After daughterboard connector assembly 28 is mounted on daughterboard 34, four fiber optic connector modules, generally designated 42, are inserted into the back of the connector housing, as described hereinafter. Each module 42 is terminated to a flat, multi-fiber cable 44 similar to fiber optic cables 40. Backplane connector assembly 26 and daughterboard connector assembly 28 are mateable in the direction of arrows "A" (FIGS. 1 and 2) to a mated condition shown in FIG. 3, wherein the fibers of cables 40 and 44 are functionally connected.

Adapter 36 of the backplane connector assembly is fixed to backplane 32 by a pair of fasteners 46. The adapter includes a housing 48 and a pair of flexible latch arms 50 spaced outwardly from opposite sides of the housing. The housing also has a pair of outwardly projecting alignment ribs 52 on opposite sides thereof.

At this point, reference is made to FIG. 1 where three intersecting arrows "X", "Y" and "Z" are shown. Arrow "X" represents a direction generally parallel to daughterboard 34. Arrow "Y" represents a direction generally perpendicular to the daughterboard. Arrow "Z" represents a direction generally parallel to the daughterboard but corresponding to the mating direction of the connector assemblies as described above by arrows "A". In other words, direction "X" is transversely of the mating direction of the connector assemblies.

Figure 4:
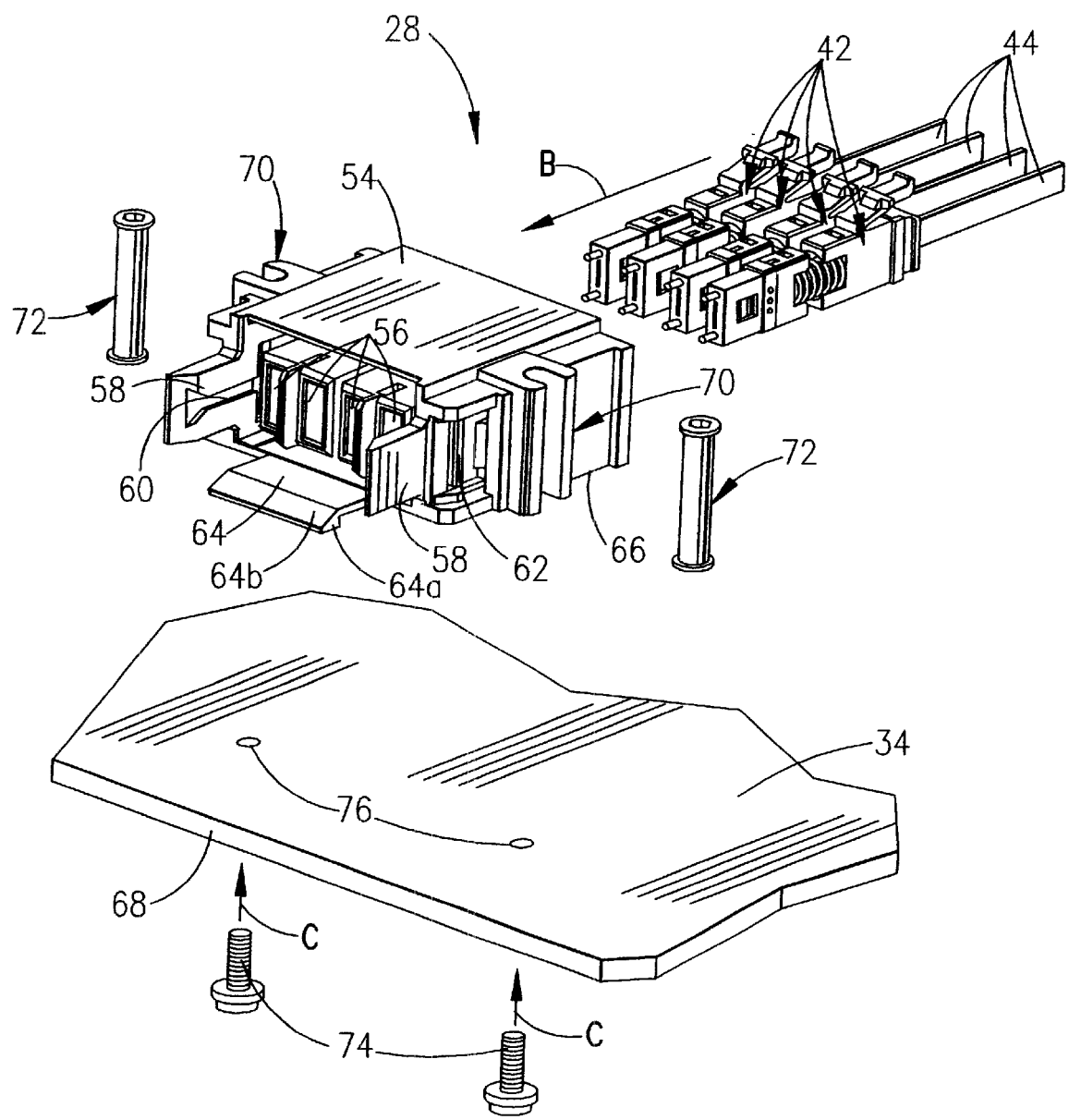
FIG. 4 is an exploded perspective view of the daughterboard connector assembly as seen to the right in FIGS. 1 and 2.

FIG. 4 shows daughterboard connector assembly 28 to include a connector housing, generally designated 54, adapted for mounting on top of daughterboard 34. The housing is molded of dielectric material such as plastic or the like and includes four through passages or receptacles 56 for receiving fiber optic connector modules 42 in the direction of arrow "B". The housing has a pair of forwardly projecting alignment flanges 58 at opposite sides thereof and between which housing 48 (FIG. 1) of adapter 36 is inserted. Alignment ribs 52 on opposite sides of the adapter housing ride into grooves 60 on the insides of alignment flanges 58. A pair of latch ribs 62 also are provided on opposite sides of housing 54 for engagement by latch arms 50 of adapter 36. A bottom flange 64 projects forwardly of housing 54 flush with a bottom surface 66 of the housing. The flange has a bottom hook portion 64a and a top chamfered portion 64b. The bottom hook portion overlaps an edge 68 of daughterboard 34. The top chamfered portion is engageable by the front bottom edge of adapter housing 48 to prevent the bottom edge of the adapter housing from "stubbing" the front edge of the daughterboard during mating of the connector assemblies.

The invention contemplates that connector housing 54 of daughterboard connector assembly 28 includes elongated channels, generally designated 70, on opposite sides thereof for receiving a pair of elongated fastening posts, generally designated 72. As will be described in greater detail hereinafter, the fastening posts are snap-fit into the channels to preload positions so that they can be transported and manipulated as a subassembly with housing 54. A pair of fasteners in the form of externally threaded bolts 74 are inserted from the bottom of daughterboard 34 in the direction of arrows "C", through holes 76 in the daughterboard, and into the bottoms of fastening posts 72, as will be seen in greater detail hereinafter. The bolts tighten fastening posts 72 to daughterboard 34, leaving connector housing 54 (i.e., daughterboard connector assembly 28) with floating movement relative to the daughterboard, all of which will be seen hereinafter.

Figure 5B:
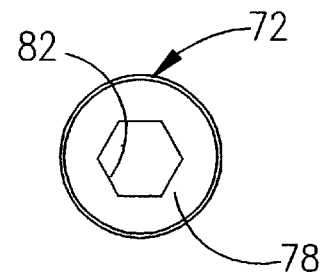
FIGS. 5A–5C a elevational view, top plan view and axial sectional view, respectively, of one of the elongated fastening posts.
Figure 5C:
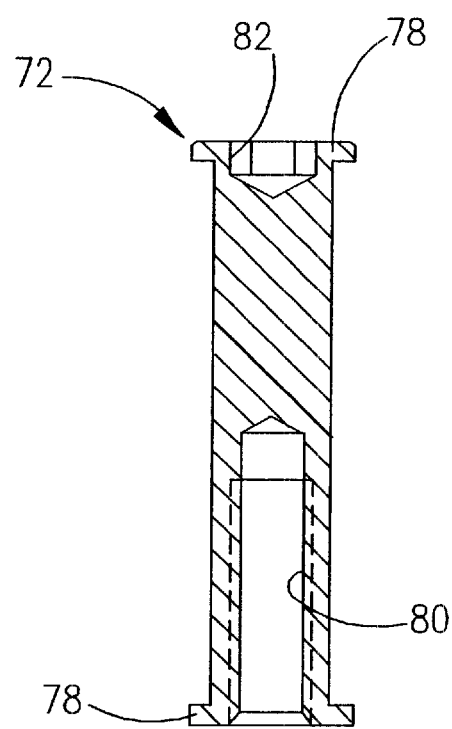
Figure 5A:
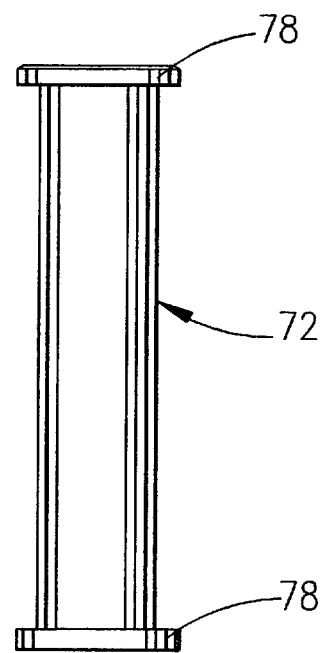

FIGS. 5A–5C show that each fastening post 72 is elongated, generally cylindrical and includes a pair of enlarged heads 78 at opposite ends thereof. The bottom of each fastening post is internally threaded, as at 80, for receiving a respective one of the bolts 74 to tighten the fastening post onto the top of daughterboard 34. The top of each fastening post includes a hexagonal socket 82 for receiving a wrench to prevent rotation of the fastening post while the bolt is threaded thereinto or to disassemble the assembly from the daughterboard if necessary.

Figure 6:
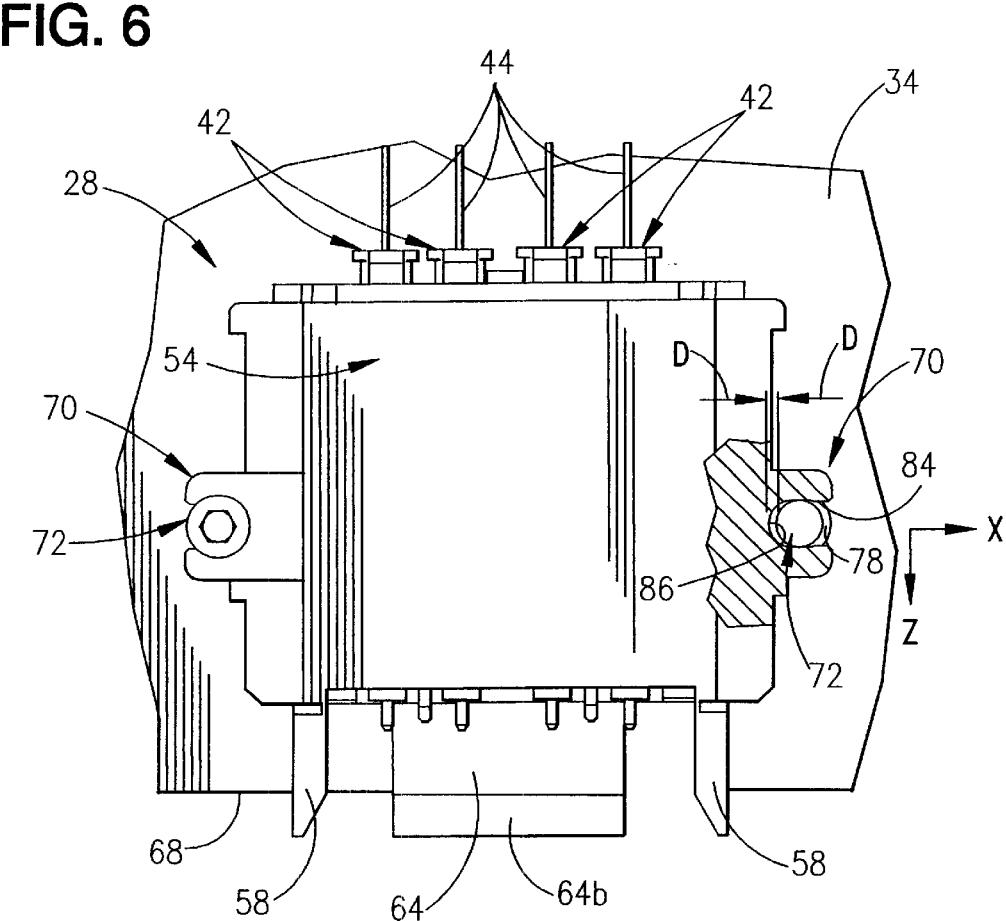
FIG. 6 is a top plan view of the daughterboard connector assembly, partially broken away to show the amount of floating between the connector assembly and the substrate generally parallel to the substrate.

Generally, FIG. 6 shows how fastening posts 72 within channels 70 provide for floating movement of connector housing 54 and, therefore, daughterboard connector assembly 28, relative to daughterboard 34 in the "X" direction described above, i.e., generally parallel to daughterboard 34 and generally perpendicular to the mating direction "Z" of the connector assemblies. First of all, FIG. 6 shows that each channel 70 has a restricted mouth 84 which is slightly narrower than the diameter of the respective fastening post 72 between heads 78 thereof. Therefore, the fastening posts can be snap-fit into the channels, past the restricted mouths 84 of the channels, to a preload position to facilitate handling and manipulation of the connector assembly without the fastening posts falling away therefrom.

FIG. 6 shows that each fastening post 72 has a cross-dimension substantially equal to the cross-dimension of the interior of channel 70 in the "Z" direction. This prevents any floating movement of the housing relative to the daughterboard in the "Z" or mating direction of the connector assemblies. On the other hand, the cross-dimension of the interior of each channel 70, i.e., between restricted mouth 84 and a base or bottom 86 of the channel, is larger than the cross-dimension of the fastening post. This differential in the dimensions is shown by arrows "D". This differential allows for floating movement of housing 54 and daughterboard connector assembly 28 relative to daughterboard 34 in the direction of arrow "X", i.e., generally parallel to the daughterboard and generally perpendicular to the mating direction of the connector assemblies.

Figure 7:
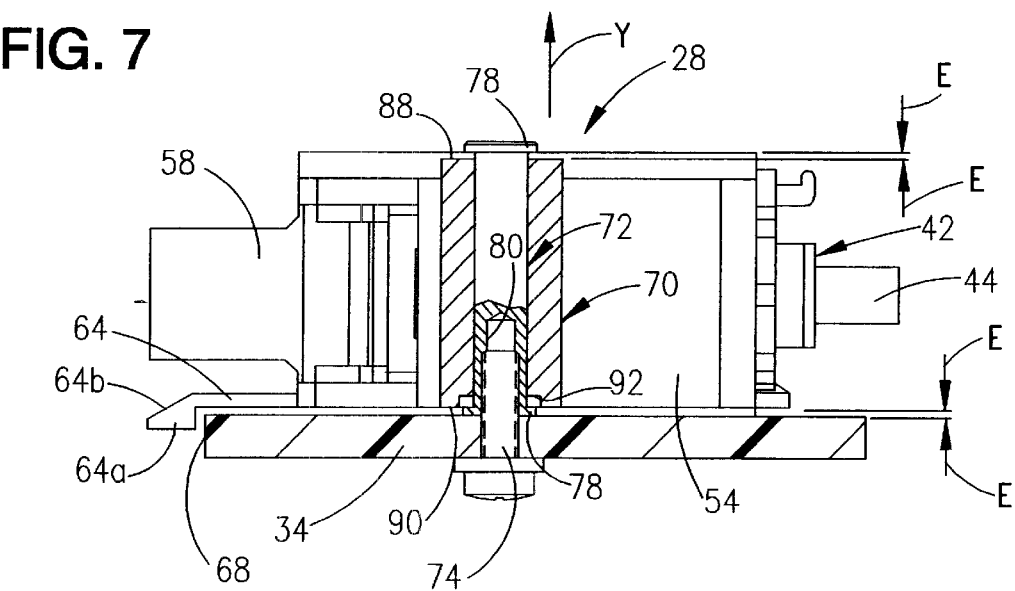
FIG. 7 is a side elevational view of the daughterboard connector assembly, partially broken and in section to show the amount of floating movement between the connector assembly and the substrate in a direction generally perpendicular to the substrate.

Generally, FIG. 7 shows the amount of floating action between connector housing 54 and daughterboard connector assembly 18 relative to daughterboard 34 in a direction generally perpendicular to the daughterboard. More particularly, it can be seen that each fastening post 72 is longer than its respective channel 70. Each channel has top and bottom ends 88 and 90, respectively. Each fastening post 72 has enlarged heads 78 as described above. These heads abut opposite ends of the respective channel. However, it can be seen in FIG. 7 that bottom end 90 of the channel is recessed, as at 92, to accommodate the bottom head 78 of the fastening post so that the connector housing can move flush downwardly onto the top of the daughterboard rather than constantly engaging the relatively small head of the fastening bolt. In any event, the length of the fastening bolt, between enlarged heads 78, is longer than the effective length of the post-receiving channel so that floating movement of connector housing 54 and daughterboard connector assembly 28 relative to daughterboard 34 is provided as indicated by arrows "E". This floating movement is in the "Y" direction described above, i.e., generally perpendicular to daughterboard 34 and generally perpendicular to the mating direction of the connector assemblies as indicated by both arrows "A" and "Z".

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for mounting a connecting device to a substrate with relative floating movement therebetween, comprising:
    a connector housing adapted for mounting on the substrate and including at least one elongated channel in a side of the housing, the channel extending generally perpendicular to the substrate and having an elongated restricted mouth opening at a side thereof;
    an elongated fastening post snap-fit into the channel past the restricted mouth thereof to a preload position, a cross-dimension of the channel being larger than a cross-dimension of the fastening post so that the post floats relative to the housing; and
    a fastener engaged with the substrate and operatively associated with the fastening post for tightening the post against the substrate, leaving the connector housing with floating movement relative to the substrate in a direction generally parallel to the substrate.

2. The system of claim 1 wherein said fastening post has an internally threaded end near the substrate, and said fastener comprises an externally threaded bolt.

3. The system of claim 1 wherein said fastening post has opposite ends and enlarged heads at the opposite ends engageable with stop surfaces on the connector housing at opposite ends of the channel.

4. The system of claim 1 wherein said fastening post has a socket in an end thereof remote from the substrate for holding the post to facilitate tightening the post against the substrate.

5. The system of claim 1 wherein said fastening post is longer than said channel to provide for floating movement of the housing relative to the substrate in a direction generally perpendicular to the substrate.

6. The system of claim 1 wherein said connector housing is adapted for mating with a complementary connecting device along a mating axis generally parallel to the substrate and perpendicular to said channel, said larger cross-dimension of the channel being generally perpendicular to said mating axis whereby the housing floats in that direction.

7. The system of claim 6 wherein the cross-dimensions of the channel and the fastening post are substantially equal in a direction generally parallel to said mating axis whereby the housing is prevented from floating in that direction.

8. A system for mounting a connecting device to a substrate with relative floating movement therebetween, comprising:
    a connector housing adapted for mounting on the substrate and including at least one elongated channel in a side of the housing, the channel extending generally perpendicular to the substrate;
    an elongated fastening post mounted in the channel, the post being longer than the channel; and
    a fastener engaged with the substrate and operatively associated with the fastening post for tightening the post against the substrate, leaving the connector housing with floating movement relative to the substrate in a direction generally perpendicular to the substrate.

9. The system of claim 8 wherein a cross-dimension of the channel is larger than a cross-dimension of the fastening post so that the housing floats relative to the post in a direction generally parallel to the substrate.

10. The system of claim 9 wherein said connector housing is adapted for mating with a complementary connecting device along a mating axis generally parallel to the substrate and perpendicular to said channel, said larger cross-dimension of the channel being generally perpendicular to said mating axis whereby the housing floats in that direction.

11. The system of claim 10 wherein the cross-dimensions of the channel and the fastening post are substantially equal in a direction generally parallel to said mating axis whereby the housing is prevented from floating in that direction.

12. The system of claim 8 wherein said fastening post has an internally threaded end near the substrate, and said fastener comprises an externally threaded bolt.

13. The system of claim 8 wherein said fastening post has an enlarged head at least at one end thereof engageable with a stop surface on the connector at an end of the channel.

14. The system of claim 8 wherein said fastening post has a socket in an end thereof remote from the substrate for holding the post to facilitate tightening the post against the substrate.

15. A system for mounting a connecting device to a substrate with relative floating movement therebetween, comprising:
    a connector housing adapted for mounting on the substrate and including at least one elongated channel in a side of the housing, the channel extending generally perpendicular to the substrate;
    an elongated fastening post mounted in the channel, a cross-dimension of the channel being larger than a cross-dimension of the fastening post so that the post floats relative to the housing; and
    a fastener engaged with the substrate and operatively associated with the fastening post for tightening the post against the substrate, leaving the connector housing with floating movement relative to the substrate in a direction generally parallel to the substrate.

16. The system of claim 15 wherein said fastening post has an internally threaded end near the substrate, and said fastener comprises an externally threaded bolt.

17. The system of claim 15 wherein said fastening post has an enlarged head at least at one end thereof engageable with a stop surface on the connector at an end of the channel.

18. The system of claim 15 wherein said fastening post has a socket in an end thereof remote from the substrate for holding the post to facilitate tightening the post against the substrate.

19. A system for mounting a connecting device to a substrate with relative floating movement therebetween, comprising:
    a connector housing adapted for mounting on the substrate and including at least one elongated channel in a side of the housing, the channel extending generally perpendicular to the substrate and having an elongated restricted mouth opening at a side thereof;

an elongated fastening post snap-fit into the channel past the restricted mouth thereof to a preload position whereby the housing and the fastening post comprise a subassembly for manipulation and handling; and a fastener engaged with the substrate and operatively associated with the fastening post for tightening the post against the substrate.

20. The system of claim 19 wherein said fastening post has an internally threaded end near the substrate, and said fastener comprises an externally threaded bolt.

21. The system of claim 19 wherein said fastening post has enlarged heads at opposite ends thereof engageable with stop surfaces on the connector housing at opposite ends of the channel.

22. The system of claim 19 wherein said fastening post has a socket in an end thereof remote from the substrate for holding the post to facilitate tightening the post against the substrate.

* * * * *